United States Patent

MacLean et al.

[11] 3,896,026
[45] July 22, 1975

[54] METHODS AND APPARATUS FOR FORMING A DENSE PHASE CATALYST TRANSFER SYSTEM

[75] Inventors: John P. MacLean, Stafford; Dorrance P. Bunn; Adolph S. Mager, both of Houston, all of Tex.

[73] Assignee: Texaco Inc., New York, N.Y.

[22] Filed: Sept. 27, 1973

[21] Appl. No.: 401,321

[52] U.S. Cl. .................. 209/250; 209/44; 209/474
[51] Int. Cl. ............................................. B07b 7/06
[58] Field of Search ........................ 209/474–476, 209/22–29, 44, 250, 490, 492, 36, 37; 302/44, 48, 51; 208/164; 23/288 E, 288 C, 288 S, 288 G; 252/417

[56] References Cited
UNITED STATES PATENTS

| | | | |
|---|---|---|---|
| 1,680,243 | 8/1928 | Becker | 209/250 |
| 2,140,827 | 12/1938 | Boag | 209/26 |
| 2,477,935 | 8/1949 | Miller | 209/250 X |
| 3,061,098 | 10/1962 | Brezinski | 209/144 X |
| 3,444,048 | 5/1969 | Schmeling et al. | 209/250 X |
| 3,642,131 | 2/1972 | Bartles et al. | 209/144 X |
| 3,661,800 | 5/1972 | Pfeiffer et al. | 252/417 |
| 3,685,651 | 8/1972 | Gruber | 209/250 X |

FOREIGN PATENTS OR APPLICATIONS 259,606   7/1928   Italy ................................ 209/250

*Primary Examiner*—Frank W. Lutter
*Assistant Examiner*—Ralph J. Hill
*Attorney, Agent, or Firm*—T. H. Whaley; C. G. Ries; Theron H. Nichols

[57] ABSTRACT

Two methods and at least one apparatus for performing the methods of forming a dense phase catalyst transfer system in a fluid catalytic cracking unit are disclosed. The apparatus comprises a novel debris collector positioned immediately under one of the elements of the fluid catalytic cracking unit in a catalyst conduit interconnecting at least two elements. The debris collector is removable, has a frustum edge deflector, a self-aligning sealing O-ring, a fritted metal plate air distributor, and a plurality of quick detachable sealing tabs between the debris collector and a standpipe housing the catalyst conduit for ease of quick removal and return of the debris collector from the standpipe.

10 Claims, 6 Drawing Figures

METHODS AND APPARATUS FOR FORMING A DENSE PHASE CATALYST TRANSFER SYSTEM

BACKGROUND OF THE INVENTION

The transfer of fluid catalytic cracking unit catalyst to and from the regenerator and catalyst storage hoppers has traditionally been in the dilute phase with flowing density about 5 pounds per cubic foot and a velocity 20–30 feet per second. In order to achieve reasonable mass flow rates of catalyst, conduit lines had to be of substantially large size. Likewise, the smaller lines suitable for dense phase flow, i.e., 35 pounds per cubic foot and only flowing at a rate of 5 feet per second have tendencies to frequently plug due to the ever present trash in the conduit transfer system, such as refractories, gauge bobs, stray metal, etc. Even with the larger dilute phase transfer conduit lines, difficult or almost impossible to maintain grates or filters are required internally of the vessels over the withdrawal nozzles to prevent plugging of the transfer lines.

OBJECTS OF THE INVENTION

Accordingly, a primary object of this invention is to provide a method for forming a dense phase catalyst transfer system which permits use of smaller conduit lines and higher density of flowing catalyst and thus eliminates substantial capital investment requirements.

Another primary object of this invention is to provide an apparatus for carrying out the method of making a dense phase catalyst transfer system that reduces operating costs by lowering air requirements for catalyst transfer.

A further object of this invention is to provide a dense phase catalyst transfer system having lower velocities in the catalyst transfer conduit lines resulting in reduced erosion of the transfer lines.

A still further object of this invention is to provide a dense phase catalyst transfer system that reduces unloading time and maintenance, provides fewer transfer conduits and accordingly simplification of the flow scheme.

Another object of this invention is to provide a dense phase catalyst transfer system that reduces maintenance problems in a fluid catalytic cracking unit by eliminating the requirements for gratings in the bottom of hoppers, trash baskets in the top of hoppers, and unloading hats in the regenerator.

Still another object of this invention is to convert a dilute phase catalyst transfer system to a dense phase catalyst transfer system principally by adding the new debris collector into the conduit system.

A further object of this invention is to provide a mechanism for carrying out the methods for forming a dense phase catalyst transfer system that is easy to operate, is of simple configuration, is economical to build and assemble, and is of greater efficiency for the transportation of catalyst through conduit lines in a fluid catalytic cracking unit.

Other objects and various advantages of the disclosed methods and apparatus for forming a dense phase catalyst transfer system in a fluid catalytic cracking unit will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, a mechanism for carrying out the methods of the invention wherein like reference numerals have been employed to indicate similar parts in the several views in which.

DESCRIPTION OF THE INVENTION

The invention disclosed herein, the scope of which being defined in the appended claims, is not limited in its application to the details of construction and arrangement of parts shown and described for carrying out the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises two methods for forming a dense phase catalyst transfer system in a fluid catalytic cracking unit and at least one mechanism for practicing the method.

The preferred method for forming a dense phase catalyst transfer system having a conduit with loading air admitted thereto for rapid transit of a mixture of catalyst and foreign debris material from one element, as a fresh catalyst storage bin or an equilibrium catalyst storage bin to another element as a regenerator in a fluid catalytic cracking unit comprises the steps of, 1. passing the catalytic mixture through a debris collector for removing substantially all foreign debris material therefrom,
2. reducing the diameter of the conduit, and
3. increasing the flowing density of the catalyst in the conduit.

Another method disclosed is a method for changing a dilute phase catalyst transfer system having a conduit with loading air admitted thereto for transit, as at 20–30 fps (feet per second), of a low density catalyst mixture of catalyst and foreign debris material, as at 5 ppcf (pounds per cubic foot), from one element to another element of a fluid catalytic cracking unit to a dense phase catalyst transfer system, as one having a density of 35 ppcf but traveling only at 5 fps, comprises the following steps:

1. removing substantially all foreign debris material from the low density catalyst mixture by passing the catalyst mixture through a debris collector in the conduit, 2. reducing the diameter of the conduit, and 3. admitting a greater amount of pure catalyst to the conduit to increase the density of catalyst flow.

DESCRIPTION OF THE APPARATUS

The drawings disclose one embodiment of the invention for carrying out or practicing the above described methods for forming a dense phase catalyst transfer system in a fluid catalytic cracking unit.

Figure 1:
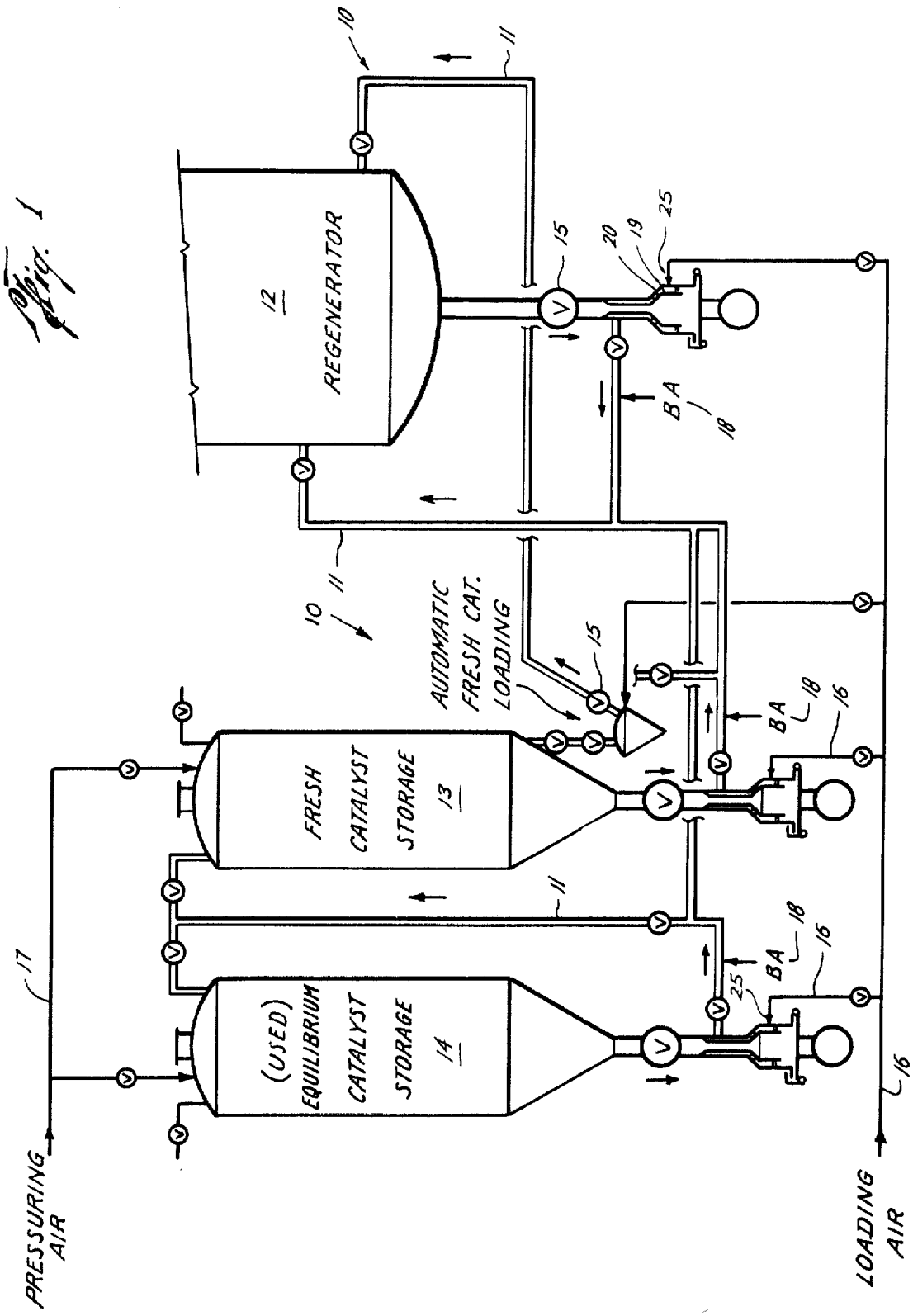
FIG. 1 is a schematic apercu elevation of the complete dense phase catalyst transfer system incorporated in a fluid catalytic cracking unit.

FIG. 1 discloses schematically a system for carrying out the above described basic methods.

The new dense phase catalyst transfer system 10, FIG. 1, in a fluid catalytic cracking unit comprises conduits 11 interconnecting a regenerator 12 with a fresh catalyst storage bin 13 and an equilibrium or used catalyst storage bin 14. Suitable valves 15 are connected throughout the conduits for control of the catalyst as it is transported therethrough by loading air in conduits 16 and pressuring air in conduits 17, the conduits 11 being cleaned by high pressure air introduced by blast air nozzles 18.

Figure 2:
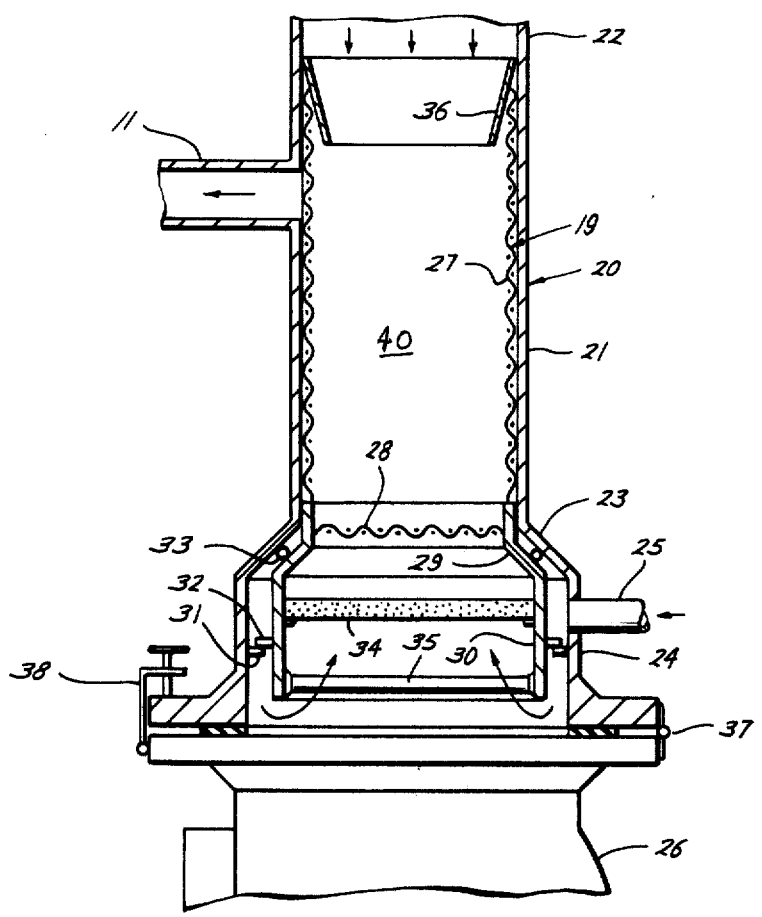
FIG. 2 is a schematic enlarged view of one of the catalyst standpipes with its debris collector therein.

The principal elements positioned in the conduits 11 are a debris collector 19, FIGS. 1 and 2 particularly, positioned directly under the regenerator 12 and each of the catalyst storage bins 13, 14.

FIG. 2 illustrates schematically one of the debris collectors 19 detachably mounted in its corresponding catalyst standpipe 20 directly under the regenerator 12, for example.

While three similar catalyst standpipes are illustrated in FIG. 1, only one catalyst standpipe 20, FIG. 2, is described hereinafter. It is mounted in the conduit vertically below the regenerator 12 comprising an upper cylindrical portion 21 having an inlet 22 and an outlet to conduit 11. A frustum portion 23 integrally connects the lower end of upper cylindrical portion 21 to the upper end of a lower cylindrical portion 24. A fluidizing air inlet nozzle 25 fed from loading air conduit 16 is mounted in the lower cylindrical portion 24 for providing fluidizing air to the space 40 internally of the debris collector 19. A detachable bottom 26 is pivotally mounted to the bottom of the catalyst standpipe lower cylindrical portion 24 for removal of the debris collector 19, described below.

A hinge 37 as shown in FIG. 2, and latch 38 provide a quick detachable latching mechanism for opening the bottom 26 of the lower portion 24 of the standpipe 20.

This debris collector 19, FIG. 2, comprises an upper foraminated cylindrical portion 27 formed of either a floor steel grating material or a conventional metallic hexagonal honeycomb material having a slideable fit internally of upper portion 21 of the catalyst standpipe 20 and for letting the catalyst pass through freely and out into conduit 11 while catching all heavier and all larger debris and foreign material. The debris collector has a bottom portion 28 which is likewise formed of a floor steel grating material or a conventional metallic hexagonal honeycomb material. A frustum 29 interconnects debris collector upper cylindrical portion 27 with a debris collector lower cylindrical portion 30. This latter cylindrical portion 30 is a solid material, as steel sheet metal of a diameter greater than that of the upper cylindrical portion 27 but substantially less than the diameter of the standpipe lower cylindrical portion 24 to accordingly provide an annular space for six detachable pairs of circumferentially equally spaced connecting tabs 31, 32 as illustrated in greater detail in FIGS. 3 and 4.

A self-aligning, metallic, sealing O-ring 33, FIG. 2, is positioned between the standpipe frustum 23 and debris collector frustum 29 for forming an air-tight seal between the standpipe and debris collector.

A fritted metal plate air distributor 34, FIG. 2, is mounted in the debris collector lower cylindrical portion 30 for even distribution of fluidizing air internally of debris collector upper cylindrical portion 27 from air inlet nozzle 25.

A suitable handle 35, FIG. 2, is secured in the debris collector 19 between the diametrically opposite bottom edges of the debris collector lower cylinder portion 30.

Figure 3:
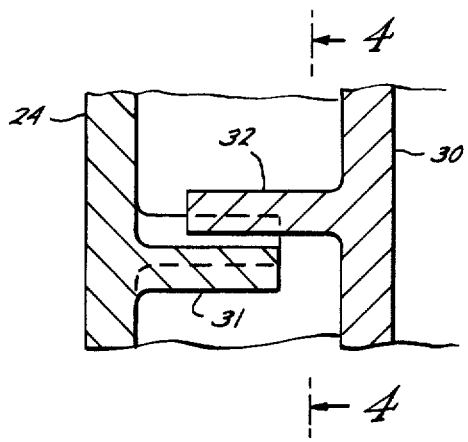
FIG. 3 is an enlarged schematic view of the two supporting tabs on the left side of the debris collector of FIG. 2.

FIG. 3 is an enlarged schematic view of one pair 31, 32 of six identical pairs of detachable connecting tabs mounted on lower cylindrical portions 24 and 30 of the catalyst standpipe and debris collector, respectively, and thus disclosing catalyst standpipe tab 31 supporting debris collector tab 32.

Figure 4:
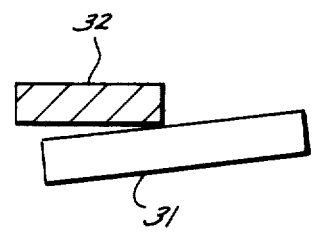
FIG. 4 is a schematic view taken at 4—4 on FIG. 3.

FIG. 4, a section at 4—4 on FIG. 3, illustrates how rotation of inner debris collector and its tab 32 will contact and be supported by tab 31.

Figure 5:
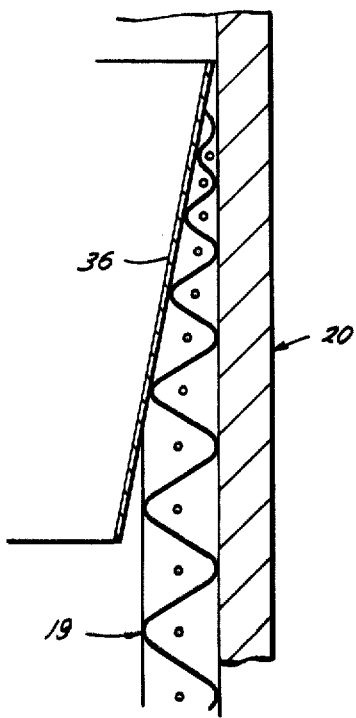
FIG. 5 is an enlarged schematic view of the deflector cone on the top of the debris collector of FIG. 2.

FIG. 5, an enlarged schematic view of a portion of the upper end of the debris collector 19 of FIG. 2, discloses the frusto-conical shaped deflector 36 on the upper end of the debris collector for making an aerodynamically smooth inlet internally of the standpipe 20 for the mixture of catalyst and any foreign material to easily flow down into the debris collector.

Figure 6:
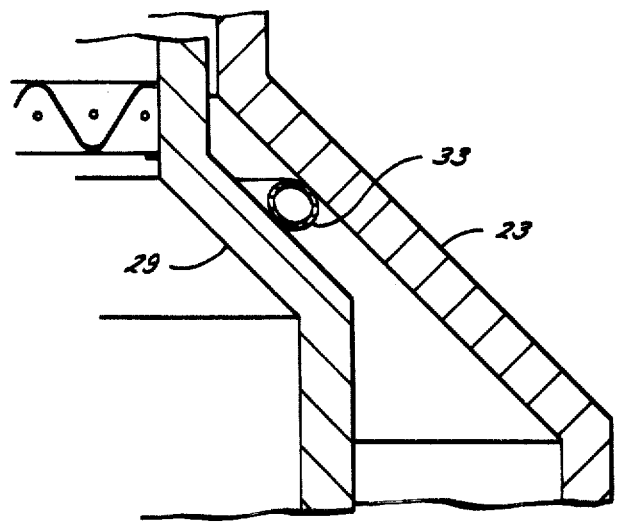
FIG. 6 is an enlarged schematic partial view of the self-aligning sealing O-ring of FIG. 2.

FIG. 6, an enlarged schematic view of a portion of the self-aligning sealing O-ring 33 of FIG. 2, illustrates the metallic O-ring, as one formed of tubular stainless steel, resting on and sealing with the debris collector frustum 29 and pressed up against the standpipe frustum 23 by the connecting tabs of FIGS. 3 and 4 as illustrated in FIG. 2.

Briefly in operation of the above disclosed embodiment, the catalytic mixture of used catalyst, usually in fine powder form, and any foreign material therein as various refractories, gauge bobs, stray metal, etc., may be dumped or exhausted from the bottom of the regenerator 12 or equilibrium catalyst storage bin 14 directly into the fluidized debris collector 19 supported in the standpipe 20.

The frusto-conical deflector 36, FIG. 2, provides a smooth flow of the catalyst mixture into the catalyst debris collector without hanging up or slowing down of the catalyst mixture due to any drag at the entrance 22 of the standpipe 20. Fluidizing air is supplied to the debris collector 19 from fluidizing air inlet nozzle 25 which with the debris collector 19 being sealed to the standpipe 20 with O-ring 33, the air then enters the debris collector from the bottom and is evenly distributed upwardly by passing through fritted air plate distributor 34 and porous bottom 28 of the debris collector upper cylindrical portion. This allows the foreign material to settle into or at least remain in the debris collector 19 as the catalyst passes out into conduit 11 to another element in the catalytic transfer system. For removing and emptying the debris collector 19, FIG. 2, the latch is unfastened, the bottom 26 pivoted out, the handle 35 rotated slightly to move the six upper connecting tabs 32 clear of the six lower tabs 31, and then the debris collector lowered for emptying. It is replaced in the reverse order of the steps above.

Thus, with the flow of practically pure used catalyst in the conduits 11, the diameter of the conduits can be reduced and the density of catalyst flow in the conduits can be increased. The result is a dense phase catalyst transfer system which has all the advantages listed above in the Objects of the Invention.

Likewise, a dilute phase catalyst transfer system may be converted to a dense phase catalyst transfer system by adding the above described debris collector into its conduits as set forth above and then accordingly reducing the size of the conduits and increasing the density of flowing catalyst therethrough. It is thus deemed apriori that another superior dense phase catalyst transfer system is formed.

Thus accordingly, it will be seen that the present disclosed methods and at least one apparatus for carrying out the methods of forming a dense phase catalytic transfer system in a fluid catalytic cracking unit operates in a manner which meets each of the objects set forth hereinbefore.

While only one embodiment of the invention has been disclosed, it will be evident that various modifications are possible in the arrangement and construction of the disclosed methods and apparatus for forming a dense phase catalyst transfer system without departing from the scope of the invention, and it is accordingly desired to comprehend within the purview of this invention such modifications as may be considered to fall within the scope of the amended claims.

We claim:

1. A method for forming a dense phase catalyst transfer system having a conduit with loading air admitted thereto for rapid transit of a catalyst mixture including foreign debris material from one element to another element in a fluid catalytic cracking unit comprising the steps of,
   a. passing the catalytic mixture through a debris collector for removing substantially all foreign debris material therefrom, and
   b. using a conduit of a smaller diameter than would be required for said catalyst mixture to increase the flowing density of the pure catalyst in the conduit.

2. A method for changing a dilute phase catalyst transfer system having conduits with loading air admitted thereto for transit of a low density catalyst mixture including foreign debris material from one element to another element of a fluid catalytic cracking unit to a dense phase catalyst transfer system comprising the steps of,
   a. removing substantially all foreign material from the low density catalyst mixture by passing the catalyst mixture through a debris collector in the conduits, and
   b. admitting a greater amount of pure catalyst to the conduits to increase the density of catalyst flow.

3. A dense phase catalyst transfer system for a fluid catalytic cracking unit comprising,
   a. conduit means for rapid transit of catalyst from one element to another element in the fluid catalytic cracking unit,
   b. deflector means for injecting catalyst into a debris collector means in said conduit means,
   c. said debris collector means comprising means for removing substantially all foreign material from the catalyst, and
   d. means for supplying fluidizing air to said debris collector means for causing increased flow of catalyst through said conduit means and accordingly forming a dense phase catalyst transfer system.

4. A dense phase catalyst transfer system as recited in claim 3 comprising further,
   a. catalyst standpipe means for containing said debris collector means having an entrance with a deflector means therein and an exit, said debris collector means having an upper end and a lower end, and
   b. said debris collector means receiving catalyst and any debris from said deflector means and discharging only catalyst to said exit.

5. A dense phase catalyst transfer system as recited in claim 4 wherein,
   a. said catalyst standpipe means comprises an upper cylindrical portion and a lower cylindrical portion of increased diameter, both portions having an internal surface,
   b. said debris collector means comprises an upper foraminated cylindrical portion and a lower cylindrical portion of increased diameter contiguous with the internal surfaces of the catalyst standpipe means for mounting therein for collecting the foreign debris, and
   c. two frustum means, each for interconnecting said upper and lower portions of each of said catalyst standpipe means and said debris collector means.

6. A dense phase catalyst transfer system as recited in claim 5 comprising,
   a. a self-aligning sealing O-ring between and contiguous with said two frustum means, and
   b. connecting tab means for detachably retaining said debris collector means in sealing engagement with said catalyst standpipe means.

7. A dense phase catalyst transfer system as recited in claim 6, wherein said sealing tab means comprises,
   a. a plurality of rigid tabs protruding normally and outwardly from the external wall of said debris collector means lower cylindrical portion, and
   b. a plurality of rigid tabs protruding normally, at an angle, and inwardly from the internal wall of said catalyst standpipe means lower cylindrical portion contiguous with the debris collector means tabs for detachably retaining said collector means in sealing engagement with said catalyst standpipe means.

8. A dense phase catalyst transfer system as recited in claim 5 wherein,
   a. said debris collector means upper cylindrical portion comprises a metallic honeycombed cylinder, and
   b. said metallic honeycombed cylinder has a removable metallic honeycombed bottom.

9. A dense phase catalyst transfer system as recited in claim 6 wherein,
   a. said means for supplying fluidizing air is connected to said catalyst standpipe means and comprises an inlet nozzle in said lower cylindrical portion for supplying fluidizing air to said debris collector means and said conduit means.

10. A dense phase catalyst transfer system as recited in claim 9 wherein,
   a. said debris collector means has a porous means in said lower cylindrical portion to ensure even distribution of said fluidizing air.

* * * * *